Sept. 10, 1940.  H. W. FINK  2,214,165
WINDSHIELD DEFROSTER
Filed Dec. 24, 1936  2 Sheets-Sheet 1

INVENTOR
HENRY W. FINK
BY Paul, Paul & Moore
ATTORNEYS

Sept. 10, 1940.   H. W. FINK   2,214,165
WINDSHIELD DEFROSTER
Filed Dec. 24, 1936   2 Sheets-Sheet 2

INVENTOR
HENRY W. FINK
BY Paul, Paul Moore
ATTORNEYS

Patented Sept. 10, 1940

2,214,165

UNITED STATES PATENT OFFICE 2,214,165

WINDSHIELD DEFROSTER

Henry W. Fink, Minneapolis, Minn., assignor, by mesne assignments, to Excel Auto Radiator Company, Chicago, Ill., a corporation of Delaware Application December 24, 1936, Serial No. 117,437

6 Claims. (Cl. 20—40.5)

This invention relates to new and useful improvements in windshield defrosters, and more particularly to a device adapted for use in connection with a suitable source of heat to deliver hot air against the surface of the windshield.

An object of the invention resides in the provision of a hot air defrosting unit comprising a conduit having a nozzle at one end for receiving hot air from a suitable source as, for example, an automobile heater, and which unit is provided with a motor driven fan for drawing the heated air into the nozzle and forcing it through the conduit and against the surface of the windshield to defrost the same.

A further object is to provide a windshield defrosting device adapted to receive its supply of hot air from a conventional automobile heater, and which device is so designed that it is not dependent upon the operation of the usual heater motor for its operation, said windshield defrosting device being constructed as an independent unit comprising a blower and motor, and a suitable flexible conduit having means at one end adapted to be positioned to receive warm or hot air from the usual automobile heater, and having means at its opposite end for distributing the hot air over the surface of the windshield or some other glazed panel, and whereby said defrosting device may be operated independently of the heater motor, thereby not to heat the interior of the vehicle body, when it is so desired.

Other objects of the invention reside in the unitary construction of the defrosting device; in the unique means provided for supporting the motor driven fan of the defroster adjacent to the source of heat; in the means provided for connecting the intake connection of the defroster blower directly to the heater casing to one side of the usual hot air opening in the front of the heater casing, whereby it does not obstruct the circulation of hot air from the heater; and, in the provision of a simple and inexpensive defroster having means for supporting it within the vehicle body, independently of the usual heater thereof, and in such a manner that its operation may be conveniently controlled from the driver's seat, regardless of whether or not the heater motor is operating.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
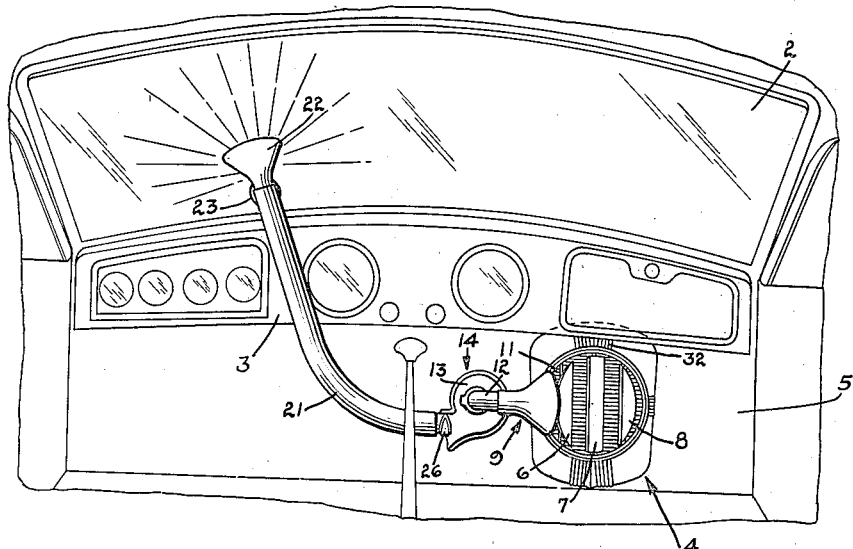
Figure 1 is a view showing the instrument panel and windshield of a conventional automobile having the improved defroster herein disclosed, mounted in position thereon.

In the selected embodiment of the invention here shown, there is illustrated in Figure 1, a portion of a conventional automobile comprising the usual windshield 2, instrument panel 3, and hot water heater 4 mounted on the dash 5, beneath the instrument panel, in the usual manner. The heater is shown provided with deflectors 6, 7, and 8 for controlling the distribution of the hot air therefrom as it emerges from the casing after passage through the usual radiator therein.

Figure 2:
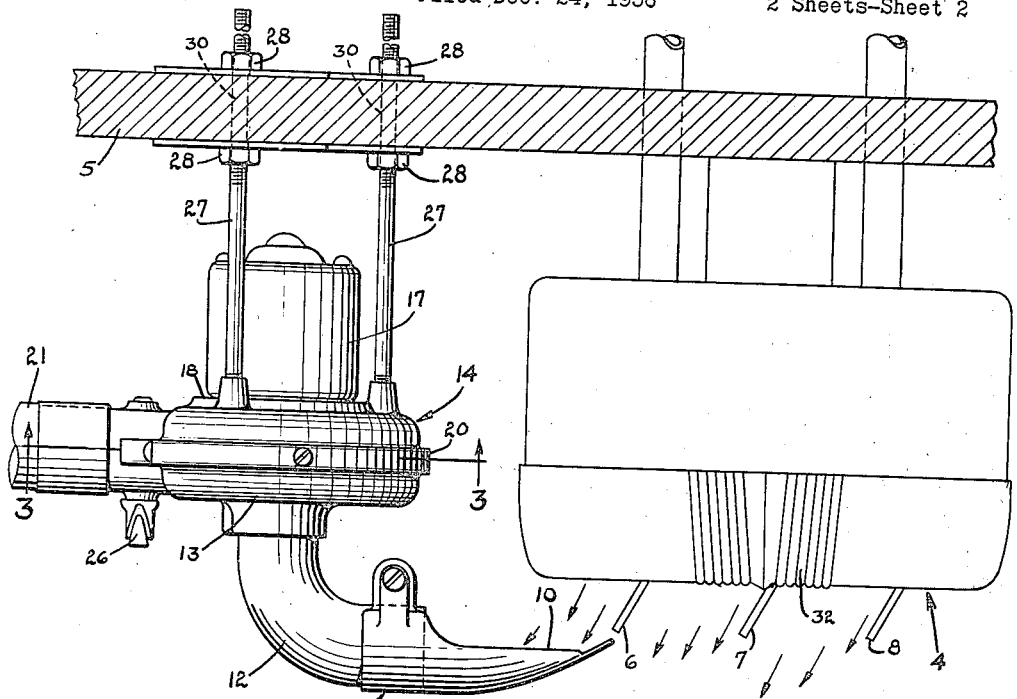
Figure 2 is a plan view of the defroster showing its position relative to the heater.
Figure 4:
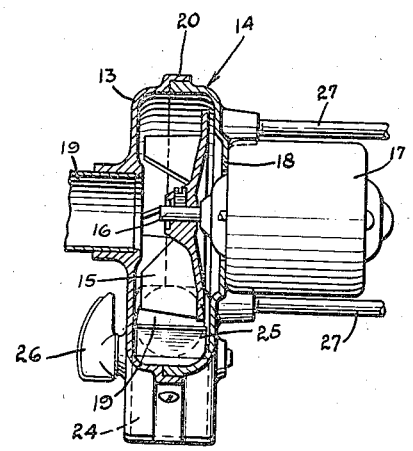
Figure 4 is a detail sectional view on the line 4—4 of Figure 3.

The novel windshield defroster herein disclosed, is shown comprising a suitable intake nozzle 9, having an outwardly spread or flared receiving end or mouth 10 adapted to be positioned adjacent to or over a portion of the opening 11 in the front wall of the heater casing, as clearly illustrated in Figures 1 and 2. The nozzle 9 is shown suitably clamped to an elbow 12 supported on the housing 13 of the blower, generally indicated by the numeral 14. The elbow 12 constitutes the intake connection of the blower housing 13. The housing 13 contains a suitable fan 15 secured to the shaft 16 of a suitable motor 17, suitably secured to the rear wall 18 of the housing 13 of the blower 14, as best shown in Figure 4. The housing 13 is preferably split, as shown at 20 in Figures 2 and 4, to facilitate assembly.

The blower housing 13 has a discharge opening 19 to which one end of a flexible conduit 21 is connected. The opposite end of this conduit has a nozzle 22 secured thereto adapted to be positioned adjacent to the surface of the windshield by such means as a vacuum cup 23, as best shown in Figure 1.

Figure 3:
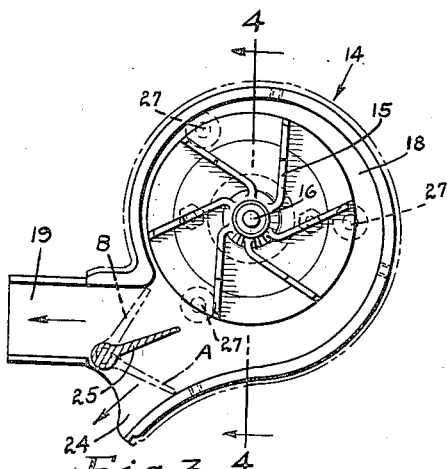
Figure 3 is a detail sectional view on the line 3—3 of Figure 2, showing the valve in the lower portion of the blower casing for controlling the directional flow of air therefrom.

Means is provided whereby a portion of the heated air drawn into the nozzle 9 may be directed downwardly in a direction towards the driver's feet, whereby the device may also serve as a foot warmer. Such means is best shown in Figure 3, and comprises an auxiliary discharge opening 24, provided with a valve 25 mounted for oscillatory movement by a suitable hand lever 26. In Figure 3, the valve 25 is shown in its intermediate position, whereby only a portion of the heated air drawn into the housing 13 by the fan 15, will be delivered to the windshield, while the remaining portion will be directed downwardly in a direction towards the driver's feet, as will readily be understood by reference to Figure 4. When the valve 25 is in the dotted line position A, all of the heated air drawn into the blower housing 13, will be directed against the windshield. When it is positioned as indicated by the dotted line B, all of the heated air will be directed downwardly into the vehicle body. Thus, it will be seen that by the provision of the valve 25, the directional flow of air from the housing 13 may be accurately controlled, as desired.

Another feature of the invention resides in the novel means provided for supporting the windshield defroster unit in operative relation to the heater 4, whereby a portion of the output of hot air from the heater, may be drawn into the housing 13 for delivery to the windshield, or to the driver's feet. As best shown in Figure 2, the blower housing 13 has secured to the back side thereof, a plurality of studs 27 having their inner ends supported in suitable apertures 30 provided in the dash 5. Clamping nuts 28 secure the studs in position in the dash 5 and thereby support the blower housing 14 in its operative position, as clearly illustrated in Figure 2. The terminals of the rods or studs 27 are threaded, as shown in Figure 2, whereby the blower housing 13 may be adjusted forwardly or rearwardly to properly position its intake nozzle 9 with respect to the heater 4.

As previously stated, one of the important features of the invention resides in the unitary construction of the defroster unit which, it will be noted by reference to Figures 1 and 2, is entirely independent of the heater 4, and has no physical connection therewith. In other words, the defroster unit is supported on the dash 5 entirely independently of the heater 4, and is so positioned with respect thereto, that a portion of the hot air discharging from the heater through the opening 11 may be drawn into the nozzle 9 to be delivered to the surface of the windshield by the action of the fan 15. The motor 17 of the defroster unit is preferably independent of the heater motor, not shown, and is controlled by a separate switch whereby its operation is entirely independent of the heater motor.

Figure 6:
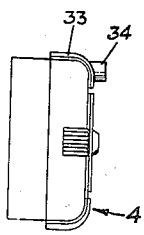
Figure 6 is a side view of the heater casing shown in Figure 5.
Figure 5:
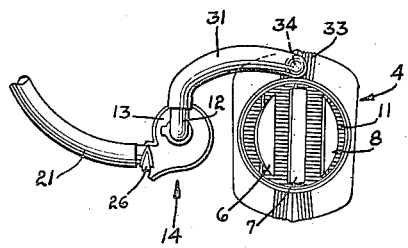
Figure 5 is a view showing a modified arrangement with the intake connection of the defroster connected to the heater casing at the upper portion thereof.
Figure 7:
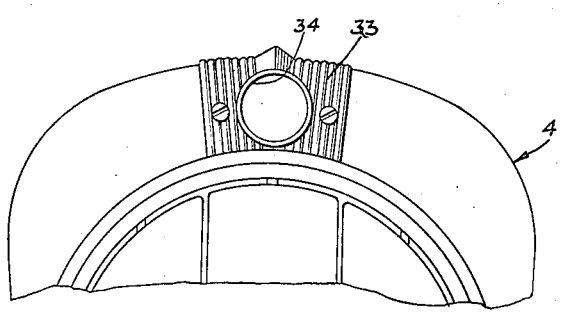
Figure 7 is a view showing a portion of the front of the heater casing, on a slightly larger scale, to illustrate the means for attaching the intake of the blower housing directly to the heater casing.

In Figures 5, 6, and 7, there is shown a construction in which the hot air intake of the defroster unit, is attached directly to the heater casing by a suitable connection 31, one end of which is connected to the L-shaped fitting 12 of the blower housing 13. The opposite end of the connection 31 is connected to the upper portion of the heater casing by substituting for the usual ornamental plate or trim 32, usually provided thereon, a correspondingly shaped trim 33, having a nozzle 34 to which the other end of the connection 31 is connected. It is to be understood that the heater casing is provided with an opening, not shown, which is normally concealed by the trim plate 32. This opening is in direct communication with the nozzle 34, when the trim plate 33 is secured to the heater casing in lieu of the plain trim plate 32. The connection 31 is preferably flexible, to facilitate installation. In the form illustrated in Figures 5, 6, and 7, the defroster unit does not obstruct any portion of the opening 11 of the heater casing.

The novel defroster herein disclosed, provides a very simple and inexpensive defrosting device. Its construction is such that it may readily be installed in any conventional automotive vehicle having some source of heat for heating the interior of the vehicle body. If desired, the intake nozzle 9 of the defroster unit may receive its supply of hot air from any other suitable source without departing from the scope of the invention. Most conventional automobiles are now provided with air heaters of some sort for heating the interior of the vehicle body, and I have therefore shown the intake nozzle positioned over a portion of the discharge opening 11 of a conventional hot water heater 4, as this arrangement provides a very simple and inexpensive one.

In the summer months when the defroster unit has no utility, it may readily be removed from the dash 5 without, in any way, affecting the heater 4. It is also to be noted that by the provision of the valve 25, should conditions be such that it is not necessary to conduct a portion of the hot air against the surface of the windshield, all of the hot air drawn into the blower housing 13 may be directed downwardly against the driver's feet. This is a very desirable feature, as it is often difficult to obtain adequate circulation of heated air in the lower left hand corner of the interior of the vehicle body, because of the particular arrangement of the heater. It is also to be understood that, if desired, the defroster unit may be shut off completely without, in any way, interfering with the operation and utility of the heater 4.

I claim as my invention:

1. A defrosting device for a glass side of a motor vehicle including, a heater mounted on the inner side of the dash for delivering warm air to the passenger compartment, a conduit having an intake spaced from the delivery side of the heater to receive warm air therefrom, said conduit having a distributing portion disposed to apply warm air to a glass side of the vehicle, means associated with the conduit for causing heated air to enter the intake and flow from the distributing portion against the glass, comprising a blower having a casing forming part of said conduit, and means mounting the casing for adjustment to vary the spacing of said intake relatively to the front of the heater.

2. A defrosting device for a glass side of a motor vehicle including, a heater mounted on the inner side of the dash for delivering warm air to the passenger compartment, a conduit having an intake nozzle spaced from the delivery side of the heater to receive warm air therefrom, said conduit having a distributing portion disposed to apply warm air to a glass side of a vehicle, said conduit including a blower having a fan the axis of rotation of which extends longitudinally of the vehicle, and means for mounting the blower to the dash for adjusting the same in direction of the fan axis and lengthwise of the vehicle, to vary the spacing between the intake and heater.

3. Apparatus for defrosting the windshield of an automobile comprising, in combination: an automobile heating radiator; a housing for said radiator having an inlet port and separate outlet ports; a motor driven fan at said inlet port; adjustable shutters controlling one of said outlet ports; a motor driven fan to withdraw air from said housing through the remaining outlet port; a conduit connected to the delivery of the last named fan; a nozzle connected to the outlet end of said conduit positioned to deliver heated air into contact with a wind shield; and individual, separately controlled motors to drive the respective fans, whereby either or both fans may be operated with said shutters open or closed.

4. In combination with a housing comprising a part of an automobile heater, and independently operable first, second and third means for controlling exit of the air from the housing, said first and second means being simultaneously or separately operable for forcibly moving air from the housing, and said third means being adjustable to vary the amount of discharge from said housing independently of and while either or both of said first and second forcing means are operative.

5. In combination with a radiator and housing therefor, an independently operable fan supplying air to the radiator for heating and for discharging the air from the housing after heating, means adjustable for controlling the amount of discharge from the housing, and a second independently operable fan for removing heated air from the housing while said controlling means is in any control position.

6. In combination with heat exchange means and a housing therefor, and independently operable first, second and third means for controlling exit of the air from the housing after temperature modification by the heat exchange means, said first and second means being simultaneously or separately operable for forcibly moving air from the housing, and said third means being in the form of vanes adjustably mounted in an opening from the housing for controlling the amount of discharge from said housing.

HENRY W. FINK.